Feb. 15, 1966  H. ALLEN  3,235,226
VALVES
Filed Aug. 26, 1963
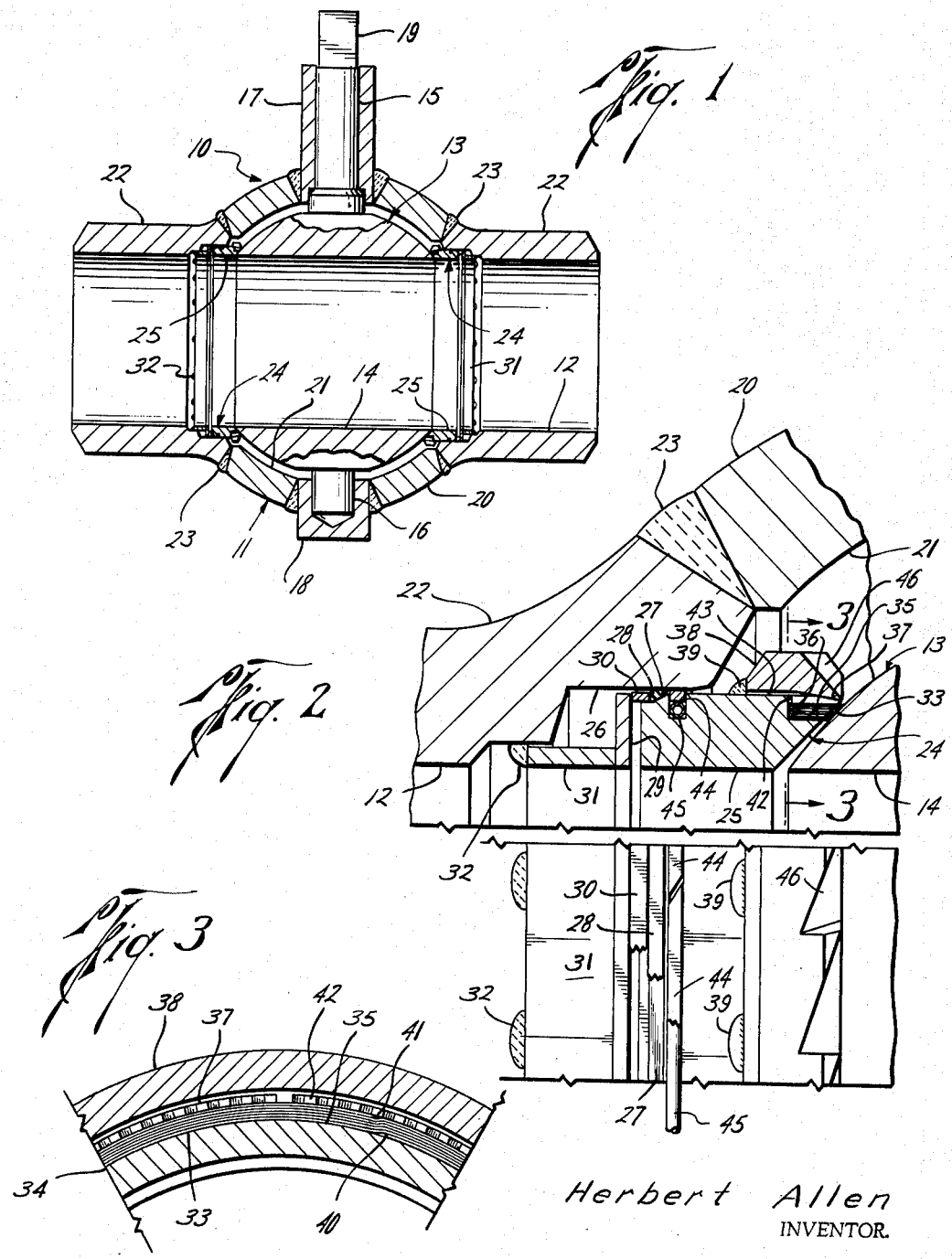
Herbert Allen
INVENTOR.
BY Browning, Simmons,
Hyer & Eickenroht
ATTORNEYS

3,235,226
VALVES

Herbert Allen, Houston, Tex., assignor to Cameron Iron Works, Inc., Houston, Tex., a corporation of Texas
Filed Aug. 26, 1963, Ser. No. 304,397
14 Claims. (Cl. 251—309)

This invention relates generally to valves. In one of its aspects, it relates to an improved polytetrafluoroethylene ring for sealably engaging with a side of a valve member. In another of its aspects, it relates to a novel arrangement for retaining the improved seal ring in valve member-engaging position within the body of the valve.

Polytetrafluoroethylene, which is commonly known as "Teflon," has many characteristics which have made it quite popular for use as a valve-seating surface. Among these are its relative hardness, lubricity, and inertness insofar as many fluids are concerned. For this reason, polytetrafluoroethylene is molded into a ring which is disposed within the valve body for sealing engagement at its inner end with the valve member; and in many cases, the ring is reinforced with a suitable material, such as fiberglass cloth. Usually, the ring is retained on a separate seat mounted within the flowway through the valve body, although it may be retained on the valve body proper, and both such means of seal ring retention are contemplated by this invention.

Despite these advantages, many polytetrafluoroethylene seal rings which are molded as one piece, and either with or without reinforcement, have been found to permit leakage therepast. This is believed to be due at least in part to certain characteristics, inherent in this material, such as its porosity and crystallinity. Thus, a concentration of either or both may create an area of low pressure resistance about the circumference of the end of the ring which engages the valve member.

An object of this invention is to provide a seal ring of polytetrafluoroethylene which will reduce the likelihood of leakage therepast, and particularly that which might otherwise occur due to the aforementioned imperfections.

This and other objects are accomplished, in accordance with the illustrated embodiment of the invention, by a seal ring made of a plurality of tightly and spirally wound wrappings of tape containing polytetrafluoroethylene. In this manner, the aforementioned spots of high porosity and/or crystallinity, as well as other defects in the polytetrafluoroethylene, are distributed in random fashion about the circumference of the ring. Thus, any such defect at the sealing end of one wrapping of the tape would ordinarily be disposed next to an unimpaired portion at the sealing end of one or both radially adjacent wrappings. This is particularly true since the tape is very thin (0.005 to 0.010 inch) and therefore provides a large number of wrappings.

More particularly, the wrappings are left unconsolidated—i.e., they are not joined together by a binder or by heating, sintering, and the like which might cause them to shrink or warp. Thus, the sealing ends of the wrappings are free to flex relatively to one another while engaged with the valve member, much in the manner of the strands of a brush, thereby reducing the likelihood of leakage due to any irregularities at the end of one wrapping.

The wrappings may consist of a single tape of pure polytetrafluoroethylene. If strength is desired, the tape may be reinforced with fiberglass cloth. In this latter case, it is preferred to interleave the reinforced wrappings with wrappings of pure polytetrafluoroethylene by using one tape of each, at least for a few turns of the winding, because the rough exterior of the reinforced tapes, when adjacent one another, could otherwise allow leakage therebetween, even when the wrappings are wound tightly.

Since the wrappings are unconsolidated, the ring is somewhat flimsy in view of its small thickness relative to its diameter, and it is therefore another object of the invention to provide a valve or a valve seat on which the ring may be formed in place, and then securely retained thereon, thereby avoiding the necessity of first heating the wrappings to consolidate them into a rigid structure.

A further object is to provide a valve seat of the character above described in which the parts for retaining the seal ring are so fabricated as to provide a simple and inexpensive means for venting the inner end of the seal ring to the valve body cavity on the downstream side of the seat, thereby reducing the likelihood of having the ring blown out of the seat, upon opening of the valve, by upstream line pressure which might leak into its inner end.

Thus, in accordance with another novel aspect of this invention, the valve or valve seat has an annular surface about which the tape is wound to form the ring; and when the ring is so formed, it is retained on the valve or valve seat by means which bears upon it to hold the wrappings tightly about the annular surface. More particularly, the seal ring is held with its inner end protruding from the surface about which it is formed and the means for retaining it so that it may seal against the valve member.

Preferably, the tape is wound about a ledge and the retaining means surrounds the ring and holds its opposite or outer end against the wall from which the ledge extends. More particularly, wedge means are disposed about the ring and a retainer ring is disposed about the wedge means to hold its rearward end against the wall and urge its inner side inwardly against the rings. This wedge means comprises arcuate wedge parts having their outer sides tapered inwardly toward the inner end of the seat body, and the retainer ring has an inner tapered surface for engaging and sliding over the tapered surfaces of the wedge parts for the purposes described. When the ring has been so disposed, it may be secured in place, as by welding to the body on which the annular ring-carrying surface is formed.

As previously indicated, if line pressure on the upstream side of the seat should leak past the ring, it might blow it out unless the outer end of the ring is vented to the downstream side of the seat. In accordance with another novel aspect of this invention, when the seal ring is formed on a valve seat, this vent is provided in part by radially extending knurls on one of the seat body walls from which the ledge extends and the ends of the arcuate wedge parts which are urged against this wall. The outer radial ends of the knurls are connected to passageway means to the exterior of the retainer ring, which is preferably formed by an annular space between a portion of the seat body beyond its face and a portion of the retainer ring which surrounds such body portion for connection thereto. This connection is made by spot welds which are spaced apart to provide a continuation of the annular space.

In the drawings, wherein like reference numerals are used to indicate like parts:

FIG. 1 is a longitudinal sectional view of a valve having seats each mounted in the flowway thereof and carrying a seal ring which is formed and retained thereon, in accordance with the present invention, for sealing engagement with the valve member;

FIG. 2 shows enlarged portions of one of said seats, the upper portion being shown in section, similarly to FIG. 1, and the lower portion being shown in elevation; and FIG. 3 is a cross sectional view of the seat, as seen along broken line 3—3 of the upper portion of FIG. 2.

With reference now to the details of the above-described drawings, the valve of FIG. 1, which is indicated in its entirety by reference character 10, comprises valve body 11 having flowway 12 therethrough and valve member 13 mounted within the body for controlling flow through the flowway. More particularly, the valve member is a ball-shaped plug having opening 14 therethrough for alignment with the flowway 12 to open same, as shown in FIG. 1, and disalignment with the flowway to dispose a solid portion across the flowway for closing same. The valve member has stems 15 and 16 on its upper and lower ends carried within bearings 17 and 18, respectively, for rotation about an axis transverse to the flowway. The lower bearing 18 is closed, while the upper bearing 17 is open to permit the stem 15 to extend therethrough so that its non-circular upper end 19 may be grasped by any suitable tool for rotating plug 13 between its open and closed positions.

The valve body 11 includes a central portion 20 providing a chamber 21 which is curved concentrically of the valve member 13 and which fits closely thereto so as to reduce the over-all size of the valve. This central body portion is preferably made up of identical parts which are split longitudinally and welded to one another along a plane parallel to the axis of the flowway 12 to capture the plug therebetween. The valve body also includes tubular portions 22 welded at 23 about their inner ends to the opposite sides of central body portion 20 so as to define the inlet and outlet of the flowway 12 on each opposite side of chamber 21.

Although the valve so illustrated and described is a plug type, it will be understood from the description to follow that the invention is equally applicable to a gate type valve. Thus, the use of the term "valve" in the claims contemplates either type.

Seats 24 are mounted within the valve body adjacent the intersection of the inlet and outlet with chamber 21 for engagement at their inner ends with opposite sides of valve member 13. Also, and as will be described, the seats are sealably slidable within the flowway, so that, upon movement of the valve member into its closed position, the upstream seat will be urged by line pressure into sealing engagement with the valve member so as to seal off the flowway. The disposal of a seat 24 on each side of the valve member permits sealing with flow in either direction through the valve.

As best shown in FIG. 2 each valve seat 24 comprises an annular body 25 having an inner diameter at least substantially the same as the inner diameter of each of the inlet and outlet of the flowway 12 and opening 14 through the valve member so as to provide substantially uninterrupted flow through the valve in its open position. The outer diameter of the seat body 25 fits rather closely but freely within the counterbore 26 of tubular body portion 22 and has an outwardly facing tapered shoulder 27 thereon which is engaged by a ring 28 of suitable sealing material. More particularly, the seal ring 28 is tapered to conform with seat 27 and is initially urged thereagainst by means of a washer-type spring 29 which is held against a ring 30 bearing on the outer side of the seal ring. The spring 29 is, in turn, held in place by a sleeve 31 welded at 32 or otherwise secured within the flowway through the tubular valve body portion 22. Thus, the spring performs the dual function of urging the end of the seat 24 against the valve member and the seal ring 28 tightly against the shoulder 27 on the seat so as to form an initial seal between the seat body and flowway. As previously mentioned, the force of the spring is supplemented by upstream line pressure when the plug 13 is closed.

As previously described, the seal ring 33 on the inner plug-engaging end of each seat body is formed from at least one tape containing polytetrafluoroethylene and wound tightly about the body to form a plurality of unconsolidated wrappings 34. Thus, as shown in FIG. 2, there is a ledge 35 on the end of the seat body projecting from a wall 36 thereof and providing an annular surface about which the tape is wound to form the ring. When so formed, the ring is retained on the seat body by arcuate wedges 37 disposable about the seal ring and a retainer ring 38 disposable about the arcuate wedges. The ring 38 is, of course, forced to the left to urge the rear end of the wedges 37 against the seat body wall 36 and to urge the inner sides of the wedges tightly against the outer circumference of the seal ring 33. It is then secured to the seat body, as by means of spot welds 39.

Prior to the assembly of the wedges and retainer ring in this manner, the seal ring is, as previously described, formed by the wrapping of at least one tape about the ledge 35. As will be noted from FIG. 2, the rear or outer end of the seal ring is also held up against the wall 36 on the seat body 25, and its longitudinal extent is sufficient to cause it to protrude outwardly from both the inner end of the seat body 25 as well as the inner end of the wedges 37 and retainer ring 38.

As previously described, and as indicated in FIG. 3, the seal ring 33 may be formed of a single tape having its inner end shown at 40 and its outer end at 41. In this case, the tape is preferably made of pure polytetrafluoroethylene. Alternatively, however, the ring may be formed of a pair of tapes wrapped spirally about the ledge 35 and one another to provide alternate wrappings of each. Such an arrangement is preferred in the event one of the tapes is reinforced with fiberglass cloth or other material having a relatively rough surface. Thus, as previously described, it is preferred in such a case to interleave the reinforced tape with a tape of pure polytetrafluoroethylene, at least for a few of the windings. In either case, each type is thin, and of a thickness in the order of 0.005 to 0.010 inch. Thus, even in a valve of even relatively small size, there will be a great number of wrappings of the tape, and particularly many more than are shown diagrammatically in FIGS. 2 and 3.

As previously described, these tightly wound wrappings of tape are left unconsolidated for two reasons. In the first place, this frees their outer ends for flexing relative to the outer surface of the valve member 13 with which they engage, thereby acting much in the order of a brush to insure a tight sealing engagement about the entire circumference of the ring. Also, since the wrappings are not consolidated, the tape need not be heated, thereby avoiding the possibility of causing additional defects in the tape due to warpage and shrinkage which generally occur upon heating and renewed localization of areas of impaired density.

As shown in FIG. 2, the outer surface of each of the wedge parts is tapered radially inwardly toward the inner end of the seat body, and the inner surface of the inner end of the retainer ring 38 is similarly tapered. Thus, as the retainer ring is moved into place over the wedge parts, it will force them to the left and into engagement with the wall 36 of the seat body. Continued forcing of the ring 38 to the left will urge the wedge parts 37 radially inwardly so as to tightly compress the seal ring about the ledge. In this respect, the inner sides of the wedges 37 at least substantially surround the outer circumference of the seal ring 33 so that the bearing thereon is uniform.

As also previously described, the outer end of the seal ring 33 adjacent the wall 36 of the seat body is vented to the downstream side of the seat by a series of passages formed between knurls 42 on the rearward end of the wedge parts 37 and the smooth face 36 on the seat body with which the knurls engage. These passages are in turn connected with an annular passage 43 formed between the outer surface of the seat body 25 beyond the face 36 and the somewhat larger inner diameter of the portion of the retainer collar 38 which surrounds this portion of the seat body. This last-mentioned annular passage 43 is in turn connected with the body cavity 21 by the spaces formed between spot welds 39 connecting the ring 38 to the seat body 25. When a seal ring of desired thickness has thus been built up about and retained on the seat body, its outer end is shaped to fit against the spherical outer surface of the plug 13.

The seal ring 28 between the seat and body may also be made of polytetrafluoroethylene. Although this material is relatively hard, it may nevertheless become extruded into the annular space, even though small, between the outer circumference of the seat body 25 and the counterbore 26. In order to prevent this extrusion, a metal split ring 44 is carried within a groove in the seat body intermediate the seal ring 28 and the sealing end of the seat and urged outwardly against the counterbore 26 by a tube 45 of polytetrafluoroethylene or other resilient material.

The ring 44 not only prevents the extrusion of seal ring 28 into the space between the seat and valve body, but also aids in the assembly of the seat within the body. Thus, as previously described, the valve body 11 is made up of central portion 20 and tubular portions 22 connected to its opposite sides. In the assembly of the valve, each seat 24 is moved into the flowway in its respective tubular member 22, and the thusly assembled seats and tubular members are then moved toward the central portion 20 of the body and valve member 13 assembled therein so as to force the ends of the seats against the valve member and permit the fomation of the welds 23. During this assembly procedure, the resiliently urged back-up rings 44 and tubes 45 serve to center the seat within tubular body portion 22 as the seat body 25 is moved into the counterbore 26.

In a preferred form of the invention, each seat, and particularly the retainer ring 38 thereof, is provided with teeth 46 about its outer circumference in position to be engaged by a dog (not shown) carried on the valve member during each operation of the valve member—i.e., during its rotation back and forth between open and closed positions. Thus, as shown and described on pages 1186F and 1186G of the 1962–63 Composite Catalog of Oil Field Equipment & Services, the seats are caused to rotate between different positions about their axes so as to thereby distribute wear about them.

From the foregoing, it will be seen that this invention is one well adapted to attain all of the ends and objects hereinabove set forth, together with other advantages which are obvious and which are inherent to the apparatus and article.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A ring for use in sealing at one end with a ball valve member, comprising a plurality of spirally wound, wrappings of tape containing polytetrafluoroethylene, said one end of the ring being shaped to conform approximately with said ball valve member, and the wrappings at said one end being unconsolidated so as to be individually flexible.

2. A ring of the character defined in claim 1, wherein there are two tapes wound about one another to provide alternate wrappings of pure polytetrafluoroethylene and fiberglass cloth impregnated with polytetrafluoroethylene, respectively.

3. A ring of the character defined in claim 1, wherein the thickness of the tape is on the order of 0.005 to 0.010 inch.

4. A valve seat, comprising an annular seat body, a seal ring comprising a plurality of wrappings of tape containing polytetrafluoroethylene and wound spirally about the seat body, and means for retaining the seal ring about said body with an end thereof protruding from the adjacent end of said body and said retaining means for engagement with a valve member surface, the wrappings at said valve member engaging end of the ring being unconsolidated so as to be individually flexible.

5. A valve seat, comprising an annular seat body, a seal ring comprising a plurality of wrappings of tape containing polytetrafluoroethylene and wound spirally about an outer annular surface of the seat body, and means bearing along the outer circumference of said ring to retain it about said outer body surface with an end thereof positioned for engagement with an adjacent valve member surface, the wrapping at said valve member engaging end of the ring being unconsolidated so as to be individually flexible.

6. A valve seat, comprising an annular seat body having an annular ledge projecting inwardly from a wall on one end of said body, a seal ring comprising a plurality of wrappings of tape containing polytetrafluoroethylene and wound spirally about the ledge, and means for retaining the seal ring about said ledge with one end engaged against said wall and the other end disposed to engage an adjacent surface of a valve member, the wrappings at said valve member engaging end of the ring being unconsolidated so as to be individually flexible.

7. A valve seat having an inner end for sealing against the closure member of a valve, comprising an annular seat body having an annular ledge projecting inwardly from an inwardly facing wall on said body, a seal ring comprising a plurality of wrappings of tape containing polytetrafluoroethylene and wound spirally about the ledge, wedge means about the seal ring, and a retainer ring about the wedge means to urge said wedge means radially inwardly against the seal ring for holding it upon said ledge with its inner end protruding from said ledge and said wedge means, the wrappings on the inner end of said seal ring being unconsolidated so as to be individually flexible.

8. A valve seat of the character defined in claim 7, wherein said retainer ring includes a portion surrounding and connected to a portion of said seat body outwardly beyond the wall thereof.

9. A valve seat of the character defined in claim 7, said body, wedge means and retainer ring providing a passageway venting the outer end of the seal ring to the exterior of said seat.

10. A valve seat having an inner end for sealing against the closure member of a valve, comprising an annular seat body having an annular ledge projecting inwardly from an inwardly facing wall on said body, a seal ring comprising a plurality of wrappings of tape containing polytetrafluoroethylene and wound spirally about the ledge, arcuate wedge segments about the sealing ring and having radially outer surfaces tapered inwardly toward the inner end of the seat body, and a retainer ring having a radially inner tapered surface engaging the tapered surfaces on the arcuate wedge segments to hold the rearward ends of said segments against the wall of the seat body and urge their radially inner surfaces inwardly against the seal ring for holding it upon said ledge with the inner end thereof protruding from said ledge and wedge segments, the wrappings on said inner end of the seal ring being unconsolidated so as to be individually flexible.

11. A valve, comprising a valve body having a flowway therethrough, a valve member mounted within the body for controlling flow through the flowway, and a seal ring retained on an annular surface within the body on one side of the valve member for engaging at its inner end with said valve member, said ring comprising a plurality of wrappings of tape containing polytetrafluoroethylene and spirally wound about said surface, the wrappings on the inner end of the seal ring being unconsolidated so as to be individually flexible.

12. A valve, comprising a valve body having a flowway therethrough, a valve member mounted within the body for controlling flow through the flowway, means providing an annular ledge projecting from a wall in the body on one side of the valve member, a seal ring comprising a plurality of wrappings of tape containing polytetrafluoroethylene and wound spirally about the ledge, and means disposable about the ring to retain the seal ring about said ledge with its inner end in position for sealing with the valve member, the wrappings on the inner end of the seal ring being unconsolidated so as to be individually flexible.

13. A valve of the character defined in claim 12, wherein said retaining means comprises wedge means at least substantially surrounding the seal ring, and a retainer ring about the wedge means to hold the rearward end of the wedge means against the face of the body and to urge said seal ring tightly about said ledge.

14. A valve of the character defined in claim 13, wherein said wedge means includes arcuate parts having radially outer surfaces tapering inwardly toward the inner end of the seal ring, and said retainer ring has a radially inner tapered surface engaging the tapered surfaces on the arcuate wedge parts.

References Cited by the Examiner

UNITED STATES PATENTS 3,002,770  10/1961  Chesnut et al. ____ 277—170 X
3,118,649  1/1964  Allen et al. _____ 251—315 X M. CARY NELSON, *Primary Examiner.*